Patented Mar. 10, 1925.

1,529,322

UNITED STATES PATENT OFFICE.

HUGO H. B. SCHAPIRO, OF WADSWORTH, OHIO, ASSIGNOR TO THE OHIO MATCH COMPANY, OF WADSWORTH, OHIO, A CORPORATION OF OHIO.

MATCH COMPOSITION.

No Drawing.   Application filed January 14, 1924.  Serial No. 686,205.

*To all whom it may concern:*

Be it known that I, HUGO H. B. SCHAPIRO, a citizen of the United States, residing at Wadsworth, in the county of Medina and State of Ohio, have invented a certain new and useful Improvement in Match Compositions, of which the following is a full, clear, and exact description.

The object of this invention is to provide a composition which is practically non-hygroscopic for use in making match heads.

As is well known, the ordinary binding material used in this class of match head compositions is animal glue, and this is a hygroscopic substance so responsive to atmospheric moisture that match heads soften and deteriorate under exposure thereto, thus preventing the ignition of the heads and frequently causing them to fall off or become detached from the sticks in attempts to strike them or light the matches.

In order to render match heads waterproof various substitutes for or additions to the common glue binder have been proposed and used with more or less success.

I am aware that it has been proposed to use rubber as a substitute for the glue binder hereinabove mentioned, but, so far as I know, in all cases where rubber has been so used the rubber employed has been the ordinary commercial rubber dissolved in some organic solvent. The use of such a solvent in preparing rubber as a binder for match head compositions entails not only an extra element of expense, because of its subsequent loss, but is dangerous because of its own inflammable nature and the liability of explosion due to the nature of its vapor when mixed with air during evaporation.

Inasmuch as, during the manufacture of matches, it is wellnigh impossible to avoid small fires incident to accidental friction on match heads, it will be seen that it would be dangerous to have the atmosphere of the match room contain inflammable vapors.

I have discovered that it is possible to obtain all of the desirable results incident to the substitution of rubber for glue binder without resorting to the use of the ordinary organic solvents, by employing rubber latex and mixing with it the other ingredients requisite to the production of a suitable match material.

The present invention, therefore, employs rubber latex as a vehicle for the mixing of the ingredients of the match composition, such mixture, after the evaporation of the aqueous content of the latex, being bound together by the rubber of the evaporated latex, which, due to its inherent non-hygroscopic properties, provides a substantially damp or waterproof match, as I will proceed now to explain and finally claim.

In the use of rubber, as last above described, as the binding ingredient in match head compositions, in accordance with the present invention, its characteristic properties of impermeability to water or moisture, its high adhesion and cohesion values, and its ability to combine with sulphur, are retained.

As hereinbefore indicated, my method contemplates the use of the natural latex from which the rubber of commerce is obtained, and which is a colloidal solution of rubber in an aqueous liquid. This material is herein referred to as "rubber latex." Upon evaporation of the water or the drying out of the water, the rubber particles which are now suspended in an aqueous liquid in an extremely finely divided, or so called colloidal state, must coalesce. The colloidal solution or emulsion of rubber in the aqueous liquid, herein called rubber latex, will pass from the system of rubber in aqueous liquid to the system of aqueous liquid in rubber and eventually upon complete evaporation of the acqueous liquid or complete desiccation, to a continuous mass of rubber. That is to say, that the originally discontinuous phase, rubber in the continuous phase, aqueous liquid, will now become continuous. The rubber particles will have coalesced. This will now act as a jelly and should have strong binding properties.

A match head made with a composition containing rubber in such a finely divided state as in rubber latex, should upon elimination of the water from the composition, be nearly perfectly moisture-proof, since rubber will greatly resist moisture.

Another method of bringing about the desired coalescence of the rubber particles of the latex in a match head composition, consists in passing such a match head through a reagent, or exposing it to the vapor of a reagent, which has the property of coagulating rubber in a latex. Acetic acid is a suitable reagent for this purpose, but of course the invention is not limited to the use of any particular reagent.

In preparing a composition for match heads of the described properties, all the ingredients which enter into the composition, including the rubber latex, are to be mixed in any usual or approved manner, and then ground, after which the composition is ready for application to the splints or sticks in the usual manner.

In stating the following formula, it is to be understood that the rubber content is based on actual rubber present in any rubber latex, natural or artificial, that is used, namely:—

|  | Parts. |
|---|---|
| Rubber | 20 |
| Sulphur flour | 10 |
| Rosin | 10 |
| Ground glass | 40 |
| Chlorate of potash | 50 |

It is also to be understood that the invention in certain of its hereinafter claimed aspects is not limited to the use of the natural emulsion commonly referred to as rubber latex, but includes artificially prepared emulsions of rubber in aqueous liquids. Emulsions of rubber in aqueous liquids are well known articles of commerce, and they contain rubber in a very finely divided state.

In some cases it may be advisable or desirable to add to the composition such materials, as, for example, hexamethylene-tetramine, or other accelerators, as will tend to gradually vulcanize the rubber at atmospheric temperature, there being sufficient sulphur present to react with such materials for this purpose. Or the match heads may be passed through any suitable solution, for example, of an ammonium polysulphide, which will serve to effect the vulcanization of the rubber.

Prior to my invention emulsions of hydrocarbon, such as rosin in aqueous solutions, or other solvents, have been used in the manufacture of match head compositions. The rosin particles in the composition, however, are practically solid when the composition is applied to the match splints, and after the evaporation of the aqueous constituent, they do not fully coalesce. In the case of rubber, however, its particles are semi-liquid or plastic, and when the liquid disappears, these particles do coalesce and form a continuous jelly which serves as an efficient non-hygroscopic binder.

What I claim is:—

1. A match head composition, including rubber latex.

2. A match head composition, containing approved ignitible ingredients, and rubber latex.

3. A match head composition, having ignitible ingredients compounded with rubber latex and a vulcanizing ingredient.

4. A match head composition, having ignitible ingredients compounded with rubber latex and a vulcanizing ingredient, the vulcanization taking place upon exposure to a suitable atmosphere.

5. A match composition, having ignitible ingredients compounded with rubber latex and a vulcanizing ingredient, the vulcanization taking place upon exposure to a suitable reagent.

6. A match composition, having ignitible ingredients compounded with rubber latex and a vulcanizing ingredient, the vulcanization taking place at the normal temperature of the air.

7. A match composition, comprising ignitible ingredients including sulphur compounded with rubber latex, said composition adapted to be vulcanized upon exposure to a suitable atmosphere.

In testimony whereof I have hereunto set my hand this 12th day of Jany., A. D. 1924.

HUGO H. B. SCHAPIRO.

Witnesses:
  D. E. SWARTZ,
  A. D. CHAPIN.